US012635602B2

(12) United States Patent
Prax et al.

(10) Patent No.: US 12,635,602 B2
(45) Date of Patent: May 26, 2026

(54) MOWER DECK HEIGHT OF CUT ADJUSTMENT MECHANISM

(71) Applicant: DEERE & COMPANY, Moline, IL (US)

(72) Inventors: Jordan A. Prax, Willow Spring, NC (US); Seth T. Baker, Fuquay Varina, NC (US)

(73) Assignee: DEERE & COMPANY, Moline, IL (US)

( * ) Notice: Subject to any disclaimer, the term of this patent is extended or adjusted under 35 U.S.C. 154(b) by 416 days.

(21) Appl. No.: 18/322,813

(22) Filed: May 24, 2023

(65) Prior Publication Data

US 2024/0389505 A1     Nov. 28, 2024

(51) Int. Cl.
  *A01D 34/74*     (2006.01)
  *B60B 33/04*     (2006.01)
(52) U.S. Cl.
  CPC .............. *A01D 34/74* (2013.01); *B60B 33/04* (2013.01)
(58) Field of Classification Search
  CPC ................................ A01D 34/74; B60B 33/04
  See application file for complete search history.

(56) References Cited

U.S. PATENT DOCUMENTS

| | | | | | |
|---|---|---|---|---|---|
| 1,810,971 | A | * | 6/1931 | Lee | .......................... B60B 33/04 |
| | | | | | 248/188.4 |
| 4,441,306 | A | | 4/1984 | Kuhn | |

| | | | | | |
|---|---|---|---|---|---|
| 4,918,783 | A | * | 4/1990 | Chu | .......................... B60B 33/04 |
| | | | | | 280/43.17 |
| 5,020,308 | A | * | 6/1991 | Braun | .................. B62D 51/002 |
| | | | | | 56/11.5 |
| 5,065,568 | A | | 11/1991 | Braun et al. | |
| 6,202,396 | B1 | | 3/2001 | Thomas | |
| 6,481,194 | B1 | | 11/2002 | Brewer et al. | |
| 6,484,481 | B1 | | 11/2002 | Langworthy et al. | |
| 6,899,345 | B1 | | 5/2005 | Bearden | |
| 7,182,178 | B2 | * | 2/2007 | Chung | ...................... B60T 1/04 |
| | | | | | 188/29 |
| 7,716,907 | B2 | | 5/2010 | Joliff et al. | |
| 8,365,354 | B1 | * | 2/2013 | Fan | .......................... B60B 33/04 |
| | | | | | 16/35 R |
| 8,684,324 | B2 | * | 4/2014 | Haydu | ................. A47B 91/028 |
| | | | | | 248/188.4 |
| 9,301,444 | B2 | | 4/2016 | Campbell et al. | |

(Continued)

FOREIGN PATENT DOCUMENTS

| | | | | | |
|---|---|---|---|---|---|
| DE | | 2020257 | A1 | * | 3/1971 |
| GB | | 2331221 | A | * | 5/1999 ............. A01D 34/74 |

(Continued)

OTHER PUBLICATIONS

English Translation of JP-2008006190-A (Year: 2008).*
English Translation of KR-20160063602-A (Year: 2016).*
English Translation of WO-2013019001-A2 (Year: 2013).*

*Primary Examiner* — Claude J Brown

(57) ABSTRACT

A mower deck height of cut adjustment mechanism includes a shaft having a caster wheel mounted to the shaft, and a screw rotatably threaded to the shaft to move the shaft vertically relative to an inner cylinder to adjust a mower deck height of cut. The inner cylinder is pivotable on a vertical axis within an outer cylinder. A locking plate may lock the screw to the inner cylinder to disable adjustment of the mower deck height of cut.

11 Claims, 4 Drawing Sheets

(56)  References Cited

U.S. PATENT DOCUMENTS

| | | | | |
|---|---|---|---|---|
| 10,609,863 | B2 * | 4/2020 | Brunner | A01D 34/74 |
| 2003/0061681 | A1 * | 4/2003 | Plate | B60B 33/0002 |
| | | | | 16/19 |
| 2004/0004331 | A1 * | 1/2004 | Pauls | B60B 33/0073 |
| | | | | 280/35 |
| 2007/0169307 | A1 * | 7/2007 | Yu | B60B 33/04 |
| | | | | 16/30 |
| 2008/0030067 | A1 * | 2/2008 | Chen | B62B 5/049 |
| | | | | 301/1 |
| 2019/0061707 | A1 * | 2/2019 | Raymond, Sr. | B60S 9/04 |
| 2019/0092095 | A1 * | 3/2019 | Plate | B60B 33/04 |

FOREIGN PATENT DOCUMENTS

| | | | | | |
|---|---|---|---|---|---|
| JP | 2008006190 | A | * | 1/2008 | |
| KR | 20160063602 | A | * | 6/2016 | B60B 33/00 |
| WO | WO-2013019001 | A2 | * | 2/2013 | B60B 33/025 |

* cited by examiner

MOWER DECK HEIGHT OF CUT ADJUSTMENT MECHANISM

FIELD OF THE INVENTION

This invention relates generally to rotary mower decks, and specifically to a mower deck height of cut adjustment mechanism.

BACKGROUND OF THE INVENTION

Grass mowing machines for mowing large areas such as parks or fields may include rotary mower decks and/or wing decks that weigh several hundred pounds. Caster wheels may be used to support the mower decks and/or wing decks. In the past, various mower deck height of cut adjustment mechanisms have been used to raise and lower the mower decks and/or wing decks to the desired height of cut.

There is a need for an improved mower deck height of cut adjustment mechanism for a mower deck and/or wing deck supported by caster wheels. There is a need for a mower deck height of cut adjustment mechanism for raising and lowering a mower deck and/or wing deck without tools, or using hand tools that are easy to use. There is a need for a mower deck height of cut adjustment mechanism that allows caster wheels to rotate on a vertical axis while the mowing vehicle is in motion. There is a need for a mower deck height of cut adjustment mechanism that improves operator visibility to the cutting edge of the mower deck and/or wing deck, improves reliability and serviceability, is light weight, and has low cost and low part count.

SUMMARY OF THE INVENTION

A mower deck height of cut adjustment mechanism includes a screw rotatable relative to a shaft having a vertical axis to adjust a mower deck height of cut with either a handle attached to a head of the screw, or with a power or hand tool engaging a socket in the screw head. The mechanism also includes a locking plate having a locked position that disables rotation of the screw relative to the vertical shaft, and a caster wheel mounted to the vertical shaft that is rotatable on the vertical axis when the locking plate is locked.

BRIEF DESCRIPTION OF THE DRAWINGS

FIG. 3 is a perspective view of a mower deck height of cut adjustment mechanism with the cap and locking plate removed according to a first embodiment of the invention.

FIG. 4 is a section view of a mower deck height of cut adjustment mechanism with the locking plate in the locked position according to a first embodiment of the invention.

DESCRIPTION OF THE PREFERRED EMBODIMENT

Figure 1:
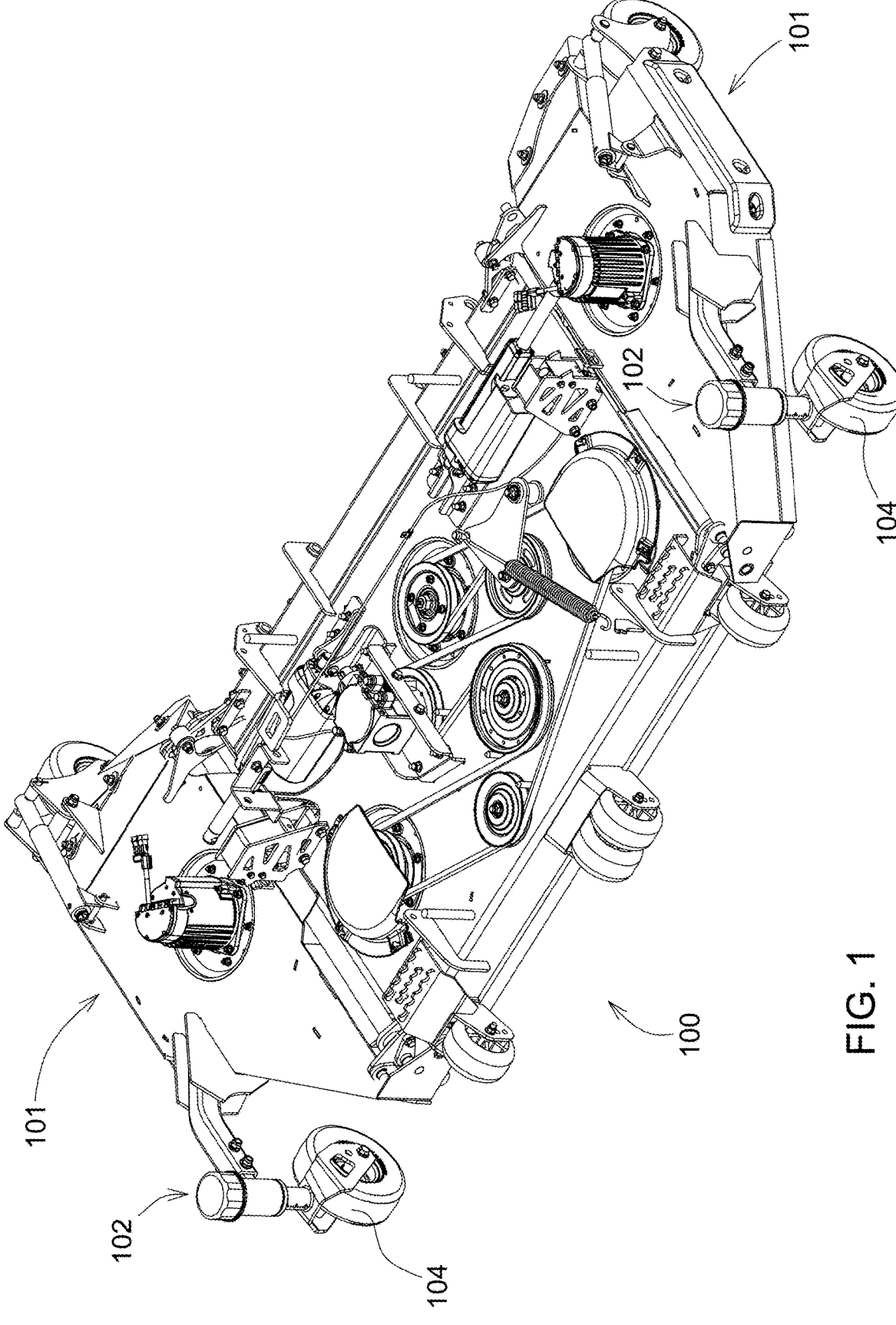
FIG. 1 is a perspective view of a mower deck with each wing deck having a mower deck height of cut adjustment mechanism according to a first embodiment of the invention.

In one embodiment shown in FIG. 1, a mower deck may include center deck 100 and one or more wing decks 101 on the left and right sides of the center deck. Each center deck and wing deck may cover one or more rotary cutting blades.

Each wing deck may be pivotably mounted to the center deck, and one or more caster wheels 104 may support the front and/or rear of each wing deck. Additionally, one or more caster wheels also may support the front and/or rear of the center deck. Mower deck height of cut adjustment mechanism 102 may be used to raise and lower the caster wheel relative to each deck to change the height of cut.

Figure 2:
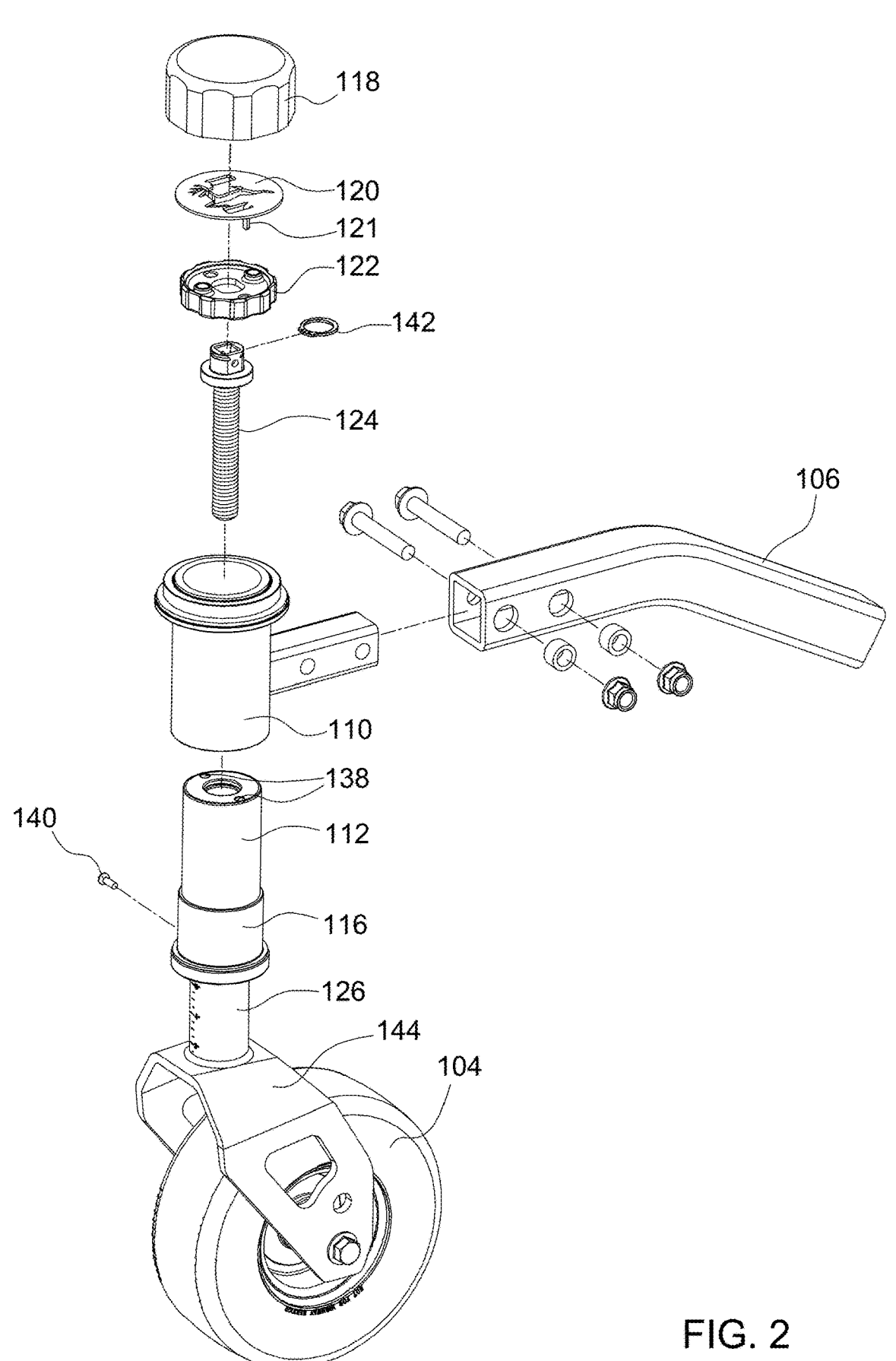
FIG. 2 is an exploded perspective view of a mower deck height of cut adjustment mechanism according to a first embodiment of the invention.
Figure 3:
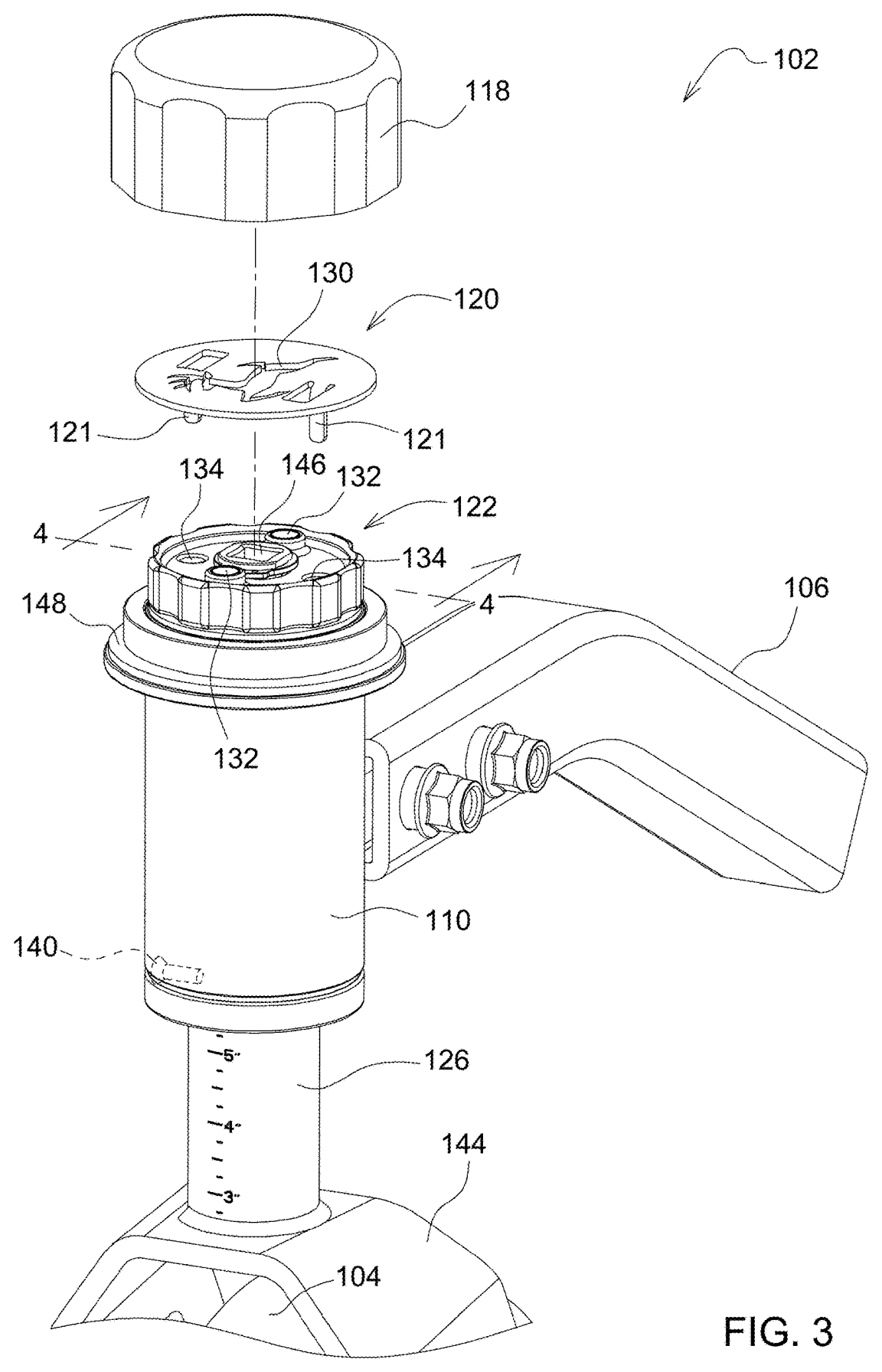
Figure 4:
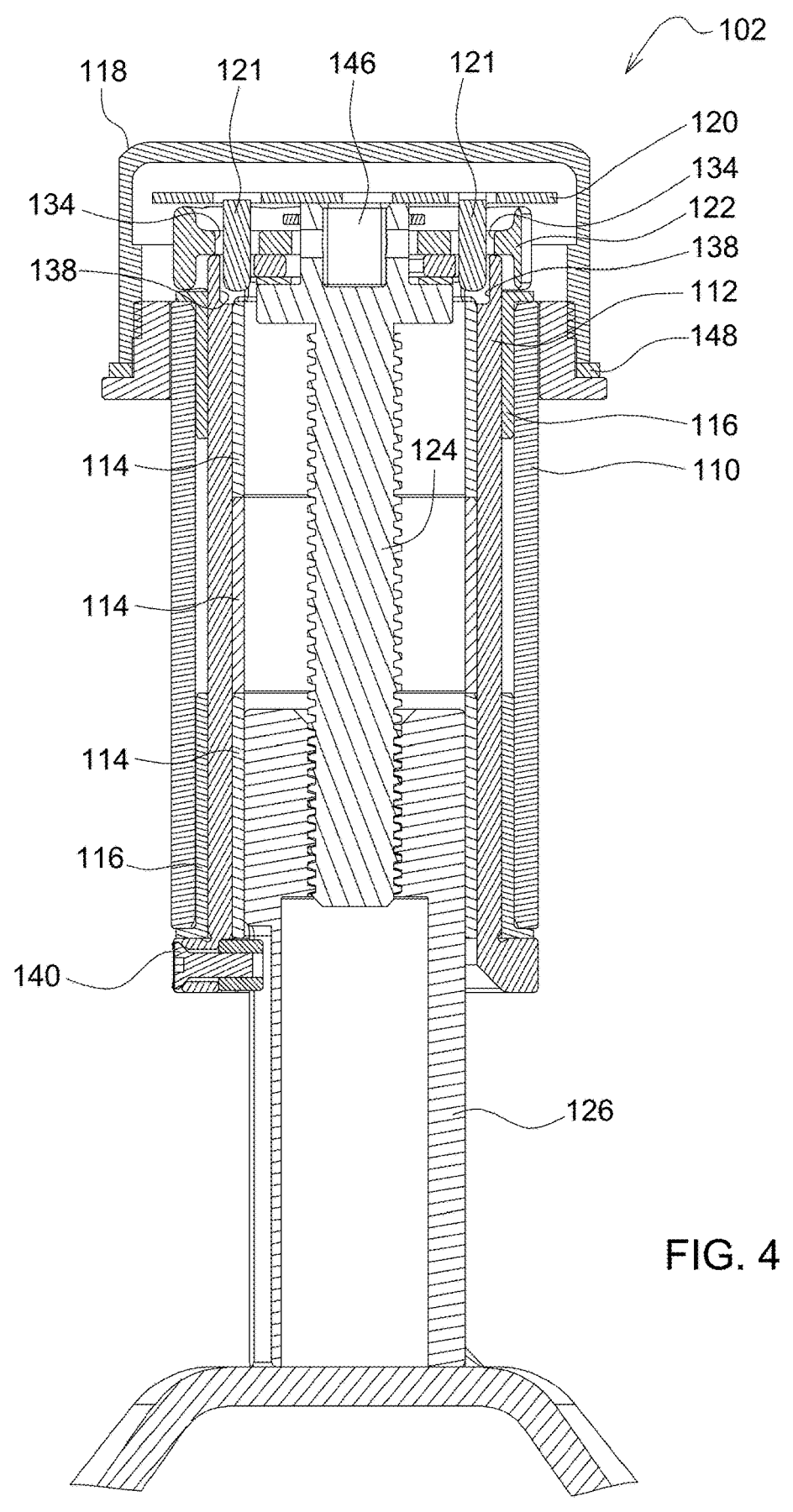

In one embodiment shown in FIGS. 2-4, mower deck height of cut adjustment mechanism 102 may include screw 124 that an operator may rotate to raise or lower shaft 126 and caster wheel 104 to change the height of cut. Screw 124 may be threaded to shaft 126 which has an internally threaded bore. Caster wheel 104 may be mounted to yoke or fork 144 attached to the bottom end of shaft 126. The operator may use handle 122 to manually rotate screw 124, or use a hand tool such as a ratchet wrench, or power tool such as an electric hand drill to engage socket 146 in the screw head to rotate the screw and adjust height of cut. Shaft 126 may have a series of marks indicating the height of cut where the shaft enters hollow inner cylinder 112. Translation of shaft 126 is improved by providing one or more inner bushings 114 between shaft 126 and inner cylinder 112.

In one embodiment shown in FIGS. 2-4, mower deck height of cut adjustment mechanism 102 may include shaft 126 and caster wheel 104 which may pivot or rotate on the vertical axis. Connector 140 may connect shaft 126 to inner cylinder 112 which also may pivot or rotate on the same vertical axis. For example, connector 140 may be a threaded fastener positioned laterally between shaft 126 and inner cylinder 112, and optionally may be secured with a nut. One or more outer bushings 116 may be provided between inner cylinder 112 and hollow outer cylinder 110. Connector 140 also may prevent shaft 126 from extending beyond a maximum height of cut position where the connector contacts a stop or shoulder.

In one embodiment shown in FIGS. 2-4, mower deck height of cut adjustment mechanism 102 may include handle 122 attached to the head of screw 124 for manual adjustment of height of cut. The operator may grip and rotate handle 122 to turn screw 124 to raise or lower shaft 126 and caster wheel 104. The handle may be disk-shaped and may fit around the head of screw 124. For example, the handle may have an opening that engages the head of screw 124, such as a double D shaped opening. Snap ring 142 also may lock handle 122 to the screw head. The handle also may stay attached to the screw head if the operator uses a power tool to engage a socket on the screw head to rotate the screw and adjust height of cut.

In one embodiment shown in FIGS. 2-4, mower deck height of cut adjustment] mechanism 102 may include cap 118 which may be threaded to the top end of outer cylinder 110. Gasket 148 also may be provided between cap 118 and outer cylinder 110. For example, FIG. 4 shows cap 118 threaded to outer cylinder 110 to cover locking plate 120, handle 122 and the head of screw 124 when the mechanism is in the locked position. The operator may remove cap 118 and locking plate 120 to adjust the height of cut manually or with a power tool. Arm 106 may connect the outer cylinder to the mower deck, and may be disconnected with threaded fasteners.

In one embodiment shown in FIG. 2-4, mower deck height of cut adjustment mechanism 102 may include locking plate 120 which may disable, or prevent unintended change or adjustment of, the height of cut. Locking plate 120 may be rotatably positioned under cap 118. Locking plate 120 may be a metal disk with one or more, and preferably two, downwardly extending pins 121. The locking plate may have one or more openings 130 to reduce weight. The operator may rotate the locking plate manually so that pins 121 line up with and can slide down into holes 134 in handle 122 and corresponding holes 138 in inner cylinder 112. Magnets 132 may be positioned on the top surface of handle 122 to help urge locking plate 120 into the locked position against handle. In the locked position, cap 118 and outer cylinder 110 do not rotate or pivot. However, locking plate 120, handle 122, screw 124, shaft 126 and inner cylinder 112 may rotate or pivot on the vertical axis, so that caster wheel 104 may rotate or pivot.

In one embodiment shown in FIGS. 2-4, mower deck height of cut adjustment mechanism 102 may include a method with the following steps. The operator may unscrew cap 118 and remove locking plate 120. The operator then may rotate handle 122 manually, or rotate screw 124 with a power tool, to adjust the height of cut. After adjusting the height of cut, the operator then may replace the locking plate and pivot it so the pins are in the locked position and replace the cap by threading it to the top of upper cylinder 110. This locks the mechanism to disable or prevent height of cut adjustments while allowing the caster wheel to rotate on a vertical axis.

Having described the preferred embodiments, it will become apparent that various modifications can be made without departing from the scope of the invention as defined in the accompanying claims.

The invention claimed is:

1. A mower deck height of cut adjustment mechanism, comprising:
    a shaft having a caster wheel mounted to the shaft;
    a screw rotatably threaded to the shaft to move the shaft vertically relative to an inner cylinder to adjust a mower deck height of cut;
    the inner cylinder pivotable on a vertical axis within an outer cylinder; and
    a locking plate to lock the screw to the inner cylinder to disable adjustment of the mower deck height of cut.

2. The mower deck height of cut adjustment mechanism of claim 1 the wherein locking plate has at least one locking pin to lock the screw to the inner cylinder.

3. The mower deck height of cut adjustment mechanism of claim 1 further comprising a handle that fits on a head of the screw to manually turn the screw.

4. The mower deck height of cut adjustment mechanism of claim 1 further comprising a bushing between the inner cylinder and the outer cylinder.

5. A mower deck height of cut adjustment mechanism, comprising:
    a screw rotatable relative to a shaft having a vertical axis to adjust a mower deck height of cut with a handle attached to a head of the screw, or with a power tool engaging a socket in the screw head;
    a locking plate having a locked position that disables rotation of the screw relative to the vertical shaft;
    a caster wheel mounted to the vertical shaft and rotatable on the vertical axis when the locking plate is locked; and
    the shaft including height of cut markings.

6. The mower deck height of cut adjustment mechanism of claim 5 further comprising a cap covering the locking plate in the locked position.

7. The mower deck height of cut adjustment mechanism of claim 5 wherein the shaft slides vertically relative to an inner cylinder which can rotate on the vertical axis relative to an outer cylinder.

8. A mower deck height of cut adjustment mechanism, comprising:
    a caster wheel on a shaft;
    a screw threaded to the shaft and rotatable relative to the shaft to adjust a mower deck height of cut by sliding the shaft vertically within an inner cylinder; and
    a locking plate to disable rotation of the screw relative to the shaft, and allowing the shaft, the inner cylinder, and the caster wheel to rotate together on a vertical axis.

9. The mower deck height of cut adjustment mechanism of claim 8 further comprising a handle mounted to a head of the screw.

10. The mower deck height of cut adjustment mechanism of claim 8 wherein the locking plate engages the screw to the inner cylinder to disable rotation of the screw relative to the shaft.

11. The mower deck height of cut adjustment mechanism of claim 10 wherein the locking plate is rotatable on the vertical axis with the inner cylinder, the shaft and the caster wheel.

* * * * *